UNITED STATES PATENT OFFICE.

HERMANN GUSSMANN, OF HÖCHST-ON-THE-MAIN, GERMANY, ASSIGNOR TO THE FARBWERKE, VORMALS MEISTER, LUCIUS & BRÜNING, OF SAME PLACE.

PROCESS OF MAKING PARA-OXY-PARA-AMIDO-ORTHO-OXYDIPHENYLAMIN.

SPECIFICATION forming part of Letters Patent No. 641,100, dated January 9, 1900.

Application filed November 7, 1899. Serial No. 736,084. (No specimens.)

*To all whom it may concern:*

Be it known that I, HERMANN GUSSMANN, Ph. D., a citizen of the Empire of Germany, residing at Höchst-on-the-Main, Germany, have invented certain new and useful Improvements in the Manufacture of Para-Oxy-Para-Amido-Ortho-Oxydiphenylamin, of which the following is a specification.

I have found that in the oxyamidodiphenylaminsulfonic acid of the formula

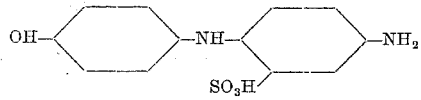

the sulfonic group may easily be exchanged for OH.

To manufacture para-oxy-para-amidodiphenylamin-ortho-sulfonic acid serving as primary material, two hundred and sixty parts, by weight, of para-nitrochlorbenzenesulfonic acid

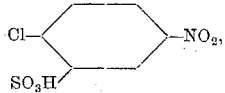

one hundred and ten parts, by weight, of amidophenol, and one hundred and thirty-six parts, by weight, of sodium acetate are heated in one thousand parts, by weight, of water for from six to eight hours on the water-bath or in a closed vessel at 120° centigrade. The oxynitrodiphenylaminsulfonic acid is thus obtained, which in form of its sodium salt may easily be salted out with common salt. To manufacture the corresponding amido acid, the aqueous solution is directly reduced with iron. The liquid of reaction is made alkaline with sodium carbonate, filtered off the iron mud and acidified, whereupon the para-oxy-para-amidodiphenylamin-ortho-sulfonic acid insoluble in water is completely precipitated in form of gray-white needles.

*Example:* Into a mixture of ten parts, by weight, of caustic alkali and four parts, by weight, of water are introduced four parts, by weight, of the above sulfonic acid, and the whole is heated for about half an hour to about 190° centigrade. On cooling a red-brown solid mass is obtained, which is dissolved in about one hundred parts, by weight, of water, and the solution, which when exposed to the air becomes an intense violet on its surface and the sides of the vessel, is acidified with sulfuric acid, whereupon the dioxyamidodiphenylamin thus obtained separates in form of its sulfate. The latter forms fine grayish-white needles easily soluble in hot water, but less easily in cold water.

The new substance when heated with sulfur and sulfids of alkali metals yields according to the degree of temperature applied a blue or black dyestuff.

Having now described my invention, what I claim is—

Process for the manufacture of para-oxy-para-amido-ortho-oxydiphenylamin, which consists in heating para-oxy-para-amido-diphenylamin-ortho-sulfonic acid with caustic alkalies at a temperature of from 150° to 200° centigrade; substantially as described.

In testimony that I claim the foregoing as my invention I have signed my name in presence of two subscribing witnesses.

HERMANN GUSSMANN.

Witnesses:
HEINRICH HAHN,
ALFRED BRISBOIS.